United States Patent
Hashimoto et al.

(10) Patent No.: US 6,612,663 B2
(45) Date of Patent: Sep. 2, 2003

(54) FIXING STRUCTURE BETWEEN LINKS AND PINS IN CRAWLER

(75) Inventors: Akira Hashimoto, Osaka (JP); Hiroyuki Nakaishi, Osaka (JP); Teiji Yamamoto, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/926,311

(22) PCT Filed: Dec. 7, 2000

(86) PCT No.: PCT/JP00/08658
§ 371 (c)(1),
(2), (4) Date: Apr. 19, 2002

(87) PCT Pub. No.: WO01/58745
PCT Pub. Date: Aug. 16, 2001

(65) Prior Publication Data
US 2002/0134595 A1 Sep. 26, 2002

(30) Foreign Application Priority Data
Feb. 14, 2000  (JP) ............................................ 2000-35449

(51) Int. Cl.⁷ ......................... B62D 25/16; B62D 55/12
(52) U.S. Cl. ...................................... 305/106; 305/204
(58) Field of Search ............................. 305/100, 103, 305/104, 106, 200, 202, 204, 59

(56) References Cited

U.S. PATENT DOCUMENTS 4,618,190 A * 10/1986 Garman et al. ............. 305/204
4,838,623 A * 6/1989 Mineart ...................... 305/204
5,069,509 A * 12/1991 Johnson et al. ............. 305/118
5,201,171 A * 4/1993 Anderton et al. ................ 59/7
6,270,173 B1 * 8/2001 Hashimoto et al. ......... 305/202

FOREIGN PATENT DOCUMENTS

| JP | 60-500761 | 5/1985 |
| JP | 64-33484 | 3/1989 |
| JP | 2001-010552 | 1/2001 |

* cited by examiner

Primary Examiner—S. Joseph Morano
Assistant Examiner—Long Bao Nguyen
(74) Attorney, Agent, or Firm—Armstrong, Westerman & Hattori, LLP.

(57) ABSTRACT

A pressure receiving surface (8) having a diameter gradually decreasing in an axially inward direction is formed at an outer end portion of a pin (1), whereas a pressing portion (7) is formed at a circumferential edge of an opening of a pin insertion hole (5) of a link (2). A retaining ring (3) is formed with a friction surface (9) to be press-contacted to the pressure receiving surface (8) when a force is applied from the pressing portion (7) upon development of a relative movement in a disengaging direction. The retaining ring (3) and the pressure receiving surface (8) share a greater area of contact than in the prior art, providing sufficient friction. This makes possible to provide a fastening structure of the link and the pin of a crawler belt which can be assembled by simple operation at a low cost, without requiring a high machining accuracy, and thus can be manufactured at a low cost.

6 Claims, 9 Drawing Sheets

FIXING STRUCTURE BETWEEN LINKS AND PINS IN CRAWLER

TECHNICAL FIELD

The present invention relates to a fastening structure between a link and a pin of a crawler belt in a vehicle such as a construction machine.

BACKGROUND ART

Figure 8:
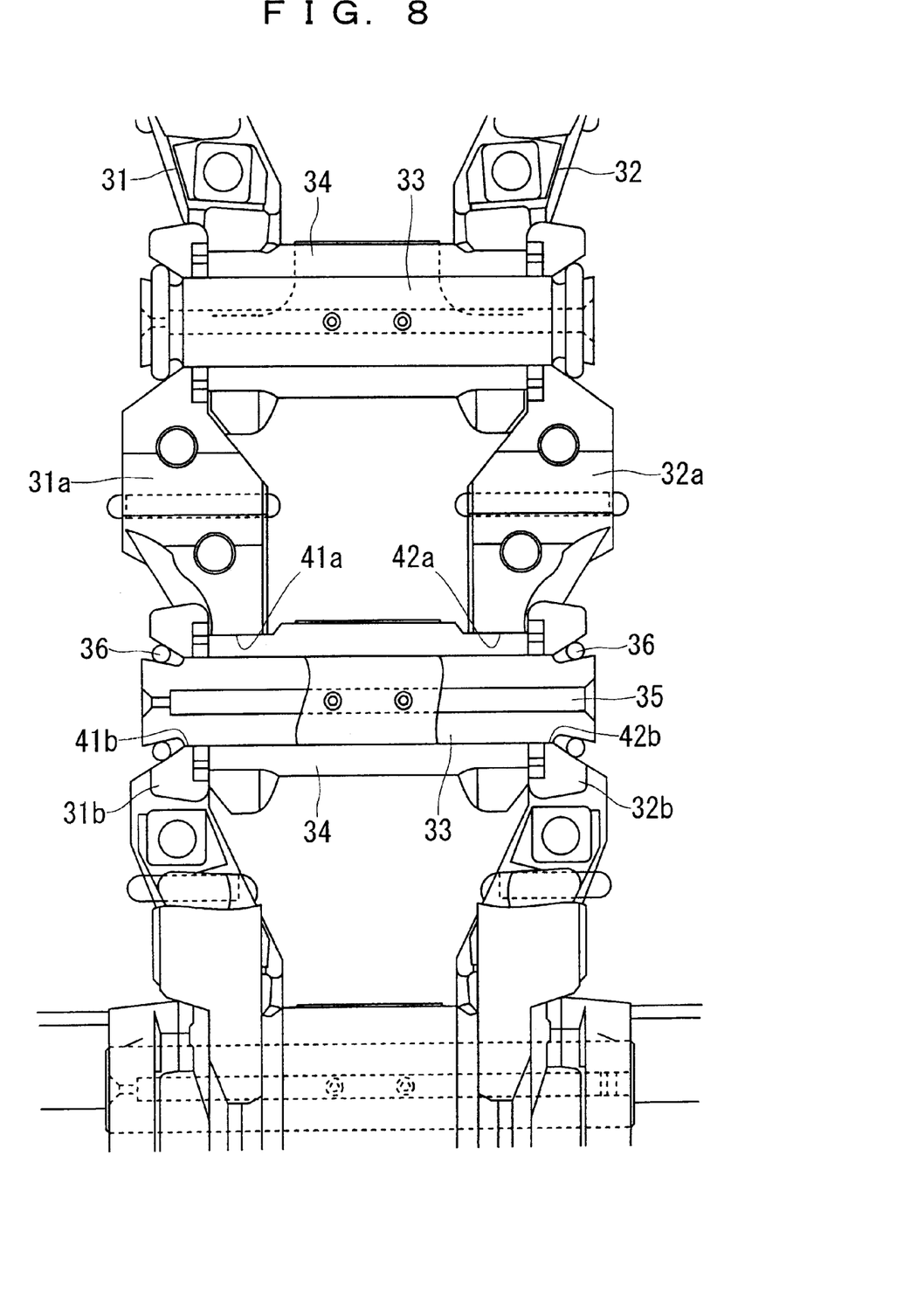
FIG. 8 is a sectional view showing an example of a fastening structure of a link and a pin of a crawler belt in a prior art crawler belt link chain.

A crawler belt utilized in a construction machine, such as a bulldozer and a hydraulic shoveling machine, comprises an endless annular link chain provided with shoes (crawler shoes) for contact with ground. The link chain has such a structure that a plurality of links are interconnected by pins. A structure of the link interconnection is shown in FIG. 8. As shown in this figure, the link chain includes a predetermined number of link pairs of a left-hand and a right-hand links 31, 32 disposed in a longitudinal direction. In each of the link pairs 31, 32, a pin 33 and a bushing 34 fasten an end portion of a longitudinally preceding link pair to a front portion of the following link pair. More specifically, the pin 33 is inserted into the bushing 34, and the bushing 34 is press-fitted into rear holes 41a, 42a of the preceding links 31a, 32a, whereas the pin 33 is press-fitted into front holes 41b, 42b of the following links 31b, 32b. Since the bushing 34 and the pin 33 are pivotable, the preceding and the following links 31a, 31b are connected with each other in a bendable manner like a joint. It should be noted here that, in FIG. 8, a portion indicated by numeral 35 is a lubricating oil supplying hole. Lubricating oil supplied here provides lubrication between the pin 33 and the bushing 34.

According to the crawler belt described as above, the pin 33 is subjected to a large force in a direction of thrust during use. Therefore, according to the link chain described as above, a retaining mechanism for preventing the pin 33 from coming out of the links 31, 32 is provided (for example, U.S. Pat. No. 4,618,190). According to this fastening structure between link and pin, an annular recess is formed around an opening of the pin insertion hole in the link. Further, close to an end portion of the pin, a circumferential groove smoothly recessing in an axially inward direction is formed. The recess in the link and the groove in the pin form a cavity having an annular opening, between the circumferential edge of the opening of the pin insertion hole and the outer end portion of the pin. Into this cavity, there is driven an annular retainer made of a metal for preventing the pin from coming out. The retainer is plastically deformed to conform to the shape of the cavity, so as to fill the cavity with the retainer, thereby preventing the pin from relative, disengaging movement out of the link toward the side away from the opening.

Now, with the above described fastening structure between link and pin, in order to prevent development of an excessive play between the link and the pin, the plastic deformation of the retainer must be carried out sufficiently so that the retainer is tightly fitted to conform to the shape of the annular cavity. However, in order to achieve this, there is a need for complex machining operation, and a high dimensional accuracy in the product. In addition, the recess of the link and the groove of the pin must be aligned with each other accurately, which leads a problem of increased cost of facility and equipment as well as cost of manufacture.

Figure 9:
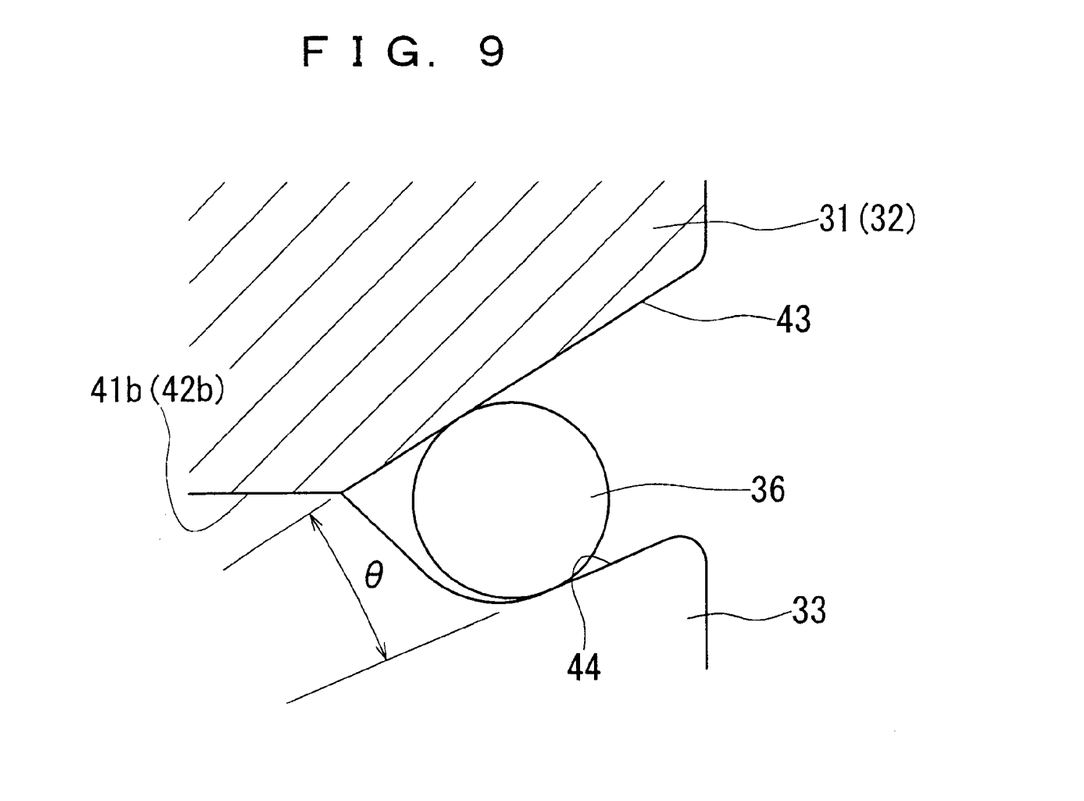
FIG. 9 is an enlarged sectional view showing a principal portion of the prior art.

In an attempt to solve the above described problem, the Japanese Patent Application No. Hei 11-182264, for example, proposes a fastening structure of link and pin, in which a retaining ring 36 is employed. Specifically, as shown in FIG. 9, an annular space 45 is formed between a circumferential edge of an opening of pin insertion holes 41b, 42b of the links 31, 32 and a corresponding end portion of a pin 33. The retaining ring 36 is disposed in this space 45, thereby preventing the relative, disengaging movement of the pin 33 toward the side away from the opening. In this case, there is formed a tapered inner surface 43 having a diameter gradually increasing from the pin insertion hole 41b toward outside, surrounding the opening of the pin insertion hole 41b. On the other hand, the pin 33 is formed with a tapered outer surface 44 facing the tapered inner surface 43. A slanting angle of the tapered outer surface 44, with respect to the axis, is slightly smaller than a slanting angle of the tapered inner surface 7. With this arrangement, the tapered surfaces 43, 44 are farther away from each other in the outward direction. The retaining ring 36 is made of an annular elastic metal having a circular section, with a part of the ring cut out so that the ring can elastically spread and shrink in diameter.

However, the above described fastening structure between link and pin of a crawler belt has the following problems resulting from that the opening portion of the pin insertion hole 41b of the link 31 and the outer end portion of the pin 33 are tapered surfaces 43, 44 respectively, and that the retaining ring 36 has a circular section. Specifically, first, assembling operation is costly. More specifically, since the section of the retaining ring 36 is circular, the ring circumferential surface cannot have a sufficient area of contact with each of the tapered surfaces 43, 44, being unable to obtain sufficient initial friction from the elastic restoring force of the retaining ring 36 alone. For this reason, in an assembling step, an operation of driving the retaining ring 36 inwardly is necessary. For this particular operation of driving the retaining ring 36, a special jig dedicated to the pressing operation must be prepared. Further, a pressing apparatus capable of providing a necessary level of driving force is necessary. As a result of these, a high cost is required for the assembling operation.

Secondly, in order to achieve a desired friction as after the assembling, the tapered inner surface 43 and the tapered outer surface 44 have to be machined to a high accuracy. Specifically, if the angle made by the two tapered surfaces 43, 44 is too large, the retaining ring 36 cannot be held by the friction and moves away, becoming unable to provide the expected function. For example, in the state shown in FIG. 9, it has been confirmed that the angle θ between the tapered surfaces 43, 44 must be smaller than 20° approximately. As a result of such a high machining accuracy required of each part, manufacturing cost of these has to increase.

The present invention is made to solve the above described problems, with an object to provide a fastening structure between link and pin of a crawler belt which can be assembled by simple operation at a low cost, without requiring a high machining accuracy, and thus can be manufactured at a low cost.

DISCLOSURE OF THE INVENTION

Now, a fastening structure of link and pin of a crawler belt according to a first invention is a fastening structure of a link and a pin in a crawler belt of a vehicle. An annular space 15 is formed between a circumferential edge of an opening of a pin insertion hole 5 of a link 2 and an outer end portion of a pin 1 to be inserted in the pin insertion hole 5, and a retaining ring 3 is disposed in the space 15 whereby preventing relative, disengaging movement of the pin 1 toward a side away from the opening. The structure is characterized in that one of the circumferential edge of the opening of the pin insertion hole 5 of the link 2 and the outer end portion of the pin 1 is formed with a tapered pressure receiving surface 8 having a diameter gradually decreasing in an axially inward direction, the other is formed with a pressing portion 7, and the retaining ring 3 is formed with a friction surface 9 to be press-contacted to the pressure receiving surface 8 by a force from the pressing portion 7 upon development of the relative movement in the disengaging direction. It should be noted here that the pressing portion 7 may be an edge portion as in the first embodiment through the third embodiment, or may be a tapered pressure receiving surface as in the fourth embodiment. In this case, a portion of the retaining ring 3 contacted by the pressing portion 7, (a pressed surface), is formed as a friction surface as in the fourth embodiment.

According to the fastening structure between link and pin of a crawler belt provided by the first invention, the following function is performed. First, if the pin 1 makes a relative movement in the disengaging direction toward the side away from the opening, then the pressing portion 7 of the link 2 contacts the pressed surface 10 of the retaining ring 3, and the friction surface 9 of the retaining ring 3 press-contacts the tapered, pressure receiving surface 8. Under this state, the ring 3 is under a force acting in the disengaging direction. This force $F_1$ can be divided into a component force $F_2$ acting vertically to the pressure receiving surface 8 and another component force $F_3$ acting along the pressure receiving surface 8. Based on this, the relative, disengaging movement toward the side away from the opening is prevented by selecting a condition that makes friction generated by the component force $F_2$ acting vertically to the pressure receiving surface 8 greater than the component force $F_3$ acting along the pressure receiving surface 8. Specifically, the pressure receiving surface 8 slanted axially inward is given a slant angle α that satisfies the above mentioned relationship $\mu \cdot F_2 > F_3$ (where $\mu$ represents friction coefficient), thereby preventing the pin from relative, disengaging movement out of the link toward the side away from the opening.

According to the fastening structure of link and pin of a crawler belt provided by the first invention, the retaining ring 3 contacts the pressure receiving surface 8 via its friction surface 9. For this reason, the retaining ring 3 has a greater area of contact with the pressure receiving surface 8 than in the prior art. Therefore, elastic restoring force of the retaining ring 3 alone can generate sufficient initial friction. Thus, there no longer is the need for the operation of inwardly driving the retaining ring 3 during the assembly. As a result, there no longer is the need for the special jig and the pressing apparatus for driving the ring 3, and as a result, it becomes possible to reduce cost necessary for the assembling operation.

Further, the slant angle α of the pressure receiving surface 8 slanting axially inward should only satisfy the above mentioned relationship $\mu \cdot F_2 > F_3$. Thus, there no longer is the need for high machining accuracy in the angle of the tapered surface as is in the prior art, and therefore it becomes possible to reduce relevant manufacturing cost.

A fastening structure between link and pin of a crawler belt according to a second invention is characterized in that the retaining ring 3 includes a pressed surface 10 contacted by the pressing portion 7, and the friction surface 9, whereas the pressed surface 10 and the friction surface 9 are farther away from each other in an outward direction.

According to the fastening structure between link and pin of a crawler belt provided by the second invention, the friction surface 9 and the pressed surface 10 of the retaining ring 3 are farther away from each other in the outward direction. Therefore, even if there is inconsistency in an engaging dimension between the pressing portion 7 and the pressure receiving surface 8 resulting from machining error, assembling error and so on, the friction surface 9 and the pressed surface 10 of the retaining ring 3 can make respective engagements at various dimensions, which means an engageable range for the two is increased. As a result, it becomes possible to allow for more generous tolerance in the shape and dimensions of the pressing portion 7 in the link 2 and of the pressure receiving surface 8 in the pin 1 than in the prior art.

A fastening structure between link and pin of a crawler belt according to a third invention is characterized in that the retaining ring 3 has a square section.

According to the fastening structure between link and pin of a crawler belt provided by the third invention, since the retaining ring 3 has a square section, manufacture thereof becomes easy, and can be embodied at a low cost.

A fastening structure between link and pin of a crawler belt according to a fourth invention is characterized in that the pressing portion 7 is formed like an edge.

According to the fastening structure between link and pin of a crawler belt provided by the fourth invention, by making one of the circumferential edge of the opening of the pin insertion hole 5 of the link 2 and the outer end portion of the pin 1 as the edge-like pressing portion 7, it becomes possible to allow for even more generous tolerance in the shape and dimensions of the pressing portion 7 in the link 2 and of the pressure receiving surface 8 in the pin 1 than in the case where both are made as tapered pressure receiving surfaces.

A fastening structure between link and pin of a crawler belt according to a fifth invention is a fastening structure of a link and a pin in a crawler belt of a vehicle. An annular space is formed between a circumferential edge of an opening of a pin insertion hole 5 of a link 2 and an outer end portion of a pin 1 inserted in the pin insertion hole 5, and a retaining ring 3 is disposed in the space 15 whereby preventing relative disengaging movement of the pin 1 toward a side away from the opening. The structure is characterized in that one of the circumferential edge of the opening of the pin insertion hole 5 of the link 2 and the end portion of the pin 1 is formed with a tapered pressure receiving surface 8 having a diameter gradually decreasing in an axially inward direction, the other is formed with an edge-like pressing portion 7, and the retaining ring 3 press-contacts each of the pressing portion 7 and the pressure receiving surface 8.

According to the fastening structure between link and pin of a crawler belt provided by the fifth invention, the following function is performed. First, in an assembling step, when the retaining ring 3 is disposed in the space 15 and the retaining ring 3 is pushed inward, then the edge-like pressing portion 7 is press-contacted to the retaining ring 3 whereas the retaining ring 3 is press-contacted to the tapered pressure receiving surface 8. Under this state, a vicinity of the contacting portion in the retaining ring 3 is elastically deformed by the pressure, providing a surface on the retaining ring 3 on the side facing the pressure receiving surface 8. In other words, a friction surface 9 contacting the pressure receiving surface 8 is created. Therefore, if the pin 1 tends to make relative movement in the disengaging direction toward the side away from the opening under this state, then the retaining ring 3 comes under a force $F_1$ acting in the disengaging direction. This force $F_1$ can be divided into a component force $F_2$ acting vertically to the pressure receiving surface 8 and another component force $F_3$ acting along the pressure receiving surface 8. Based on this, the relative, disengaging movement of the pin toward the side away from the opening is prevented by selecting a condition that makes friction generated by the component force $F_2$ acting vertically to the pressure receiving surface 8 greater than the component force $F_3$ acting along the pressure receiving surface 8. Specifically, the pressure receiving surface 8 slanted axially inward is given a slant angle $\alpha$ that satisfies the above mentioned relationship $\mu \cdot F_2 > F_3$ (where $\mu$ represents friction coefficient), thereby preventing the pin from relative, disengaging movement out of the link toward the side away from the opening.

According to the above described fastening structure between link and pin of a crawler belt provided by the fifth invention, the retaining ring 3 has the friction surface 9 provided by the assemblage, making contact with the pressure receiving surface 8. Therefore, the retaining ring 3 has a greater area of contact with the pressure receiving surface 8 than in the prior art, making possible to obtain sufficient initial friction. Further, since one of the circumferential edge of the opening of the pin insertion hole 5 of the link 2 and the outer end portion of the pin 1 is made into the edge-like pressing portion 7, the retaining ring 3 receives the pressure at a point, and thus it becomes possible to perform the assembling operation more easily, using less pressing force than in the case where the two members are each formed with a tapered surface, i.e. than in the case where the pressure is received on a surface. As a result, operating efficiency in the assembling operation can be improved.

Further, the slant angle $\alpha$ of the pressure receiving surface 8 slanting axially inward should only satisfy the above mentioned relationship $\mu \cdot F_2 > F_3$. Thus, there no longer is the need for high machining accuracy in the angle of the tapered surface as is in the prior art, and therefore it becomes possible to reduce relevant manufacturing cost. Further, since one of the link 2 and the pin has the edge-like pressing portion 7, it becomes possible to allow for more generous tolerance in the shape and dimensions of the link 2 and of the pin 1 than in the case where both are made as tapered pressure receiving surfaces.

A fastening structure between link and pin of a crawler belt according to a sixth invention is characterized in that the retaining ring 3 has a circular section.

According to the fastening structure between link and pin of a crawler belt of the sixth invention, since the retaining ring 3 has a circular section, manufacture thereof becomes easy, making possible to embody at a low cost.

BEST MODE FOR CARRYING OUT THE INVENTION

Next, specific embodiments of the fastening structure of link and pin of a crawler belt according to the present invention will be described in detail with reference to the accompanying figures. First, the retaining mechanism itself is exactly the same as the prior art shown in FIG. 8 and FIG. 9, comprising a pin 1, a link 2 and a retaining ring 3. Therefore, the description to be given here below will primarily focus on characteristic points.

Figure 1:
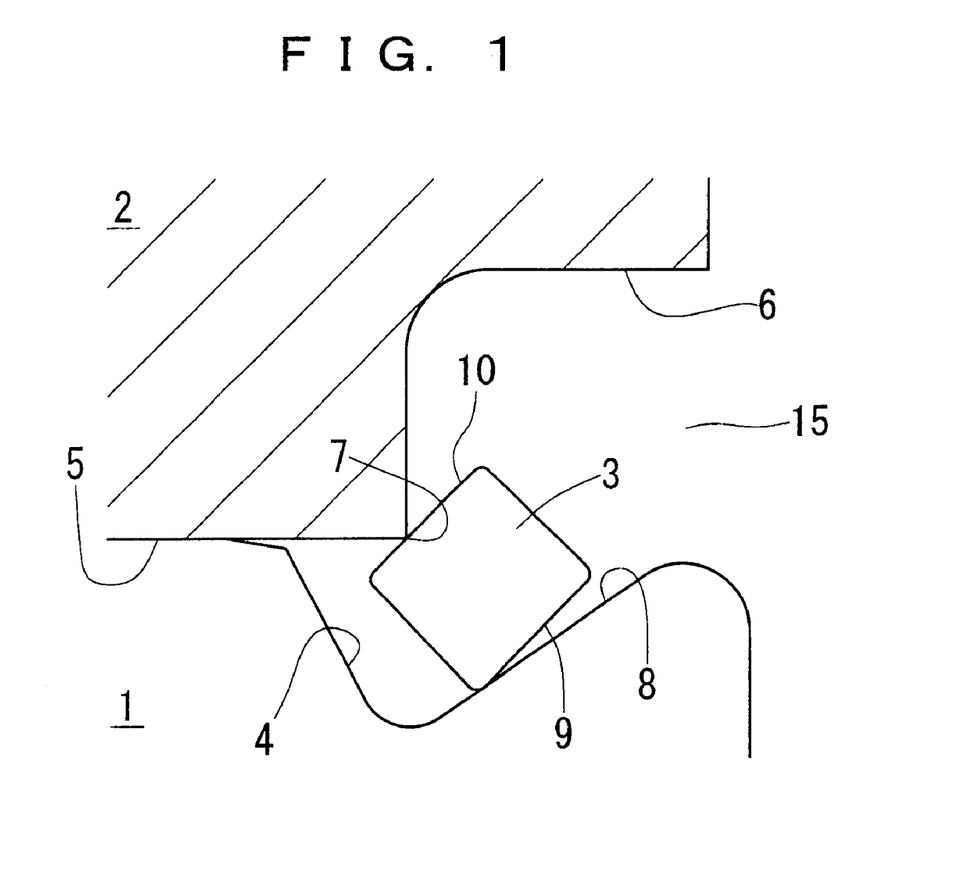
FIG. 1 is an enlarged sectional view showing a principal portion of a first embodiment of a fastening structure of link and pin of a crawler belt according to the present invention.

First, as shown in FIG. 1, the pin 1 has an end, close to which a circumferential groove 4 having a generally triangular section is formed. Further, the link 2 is formed with a pin insertion hole 5 into which the pin 1 is press-fitted. The pin insertion hole 5 has an opening, around which an annular recess 6 is formed. The groove 4 of the pin 1 and the recess 6 of the pin insertion hole 5 form an annular fitting space 15 recessing axially inward and having an annular opening, between a circumferential edge of the opening of the pin insertion hole 5 and the outer end portion of the pin 1. The recess 6 meets an edge of the opening of the pin insertion hole 5. This edge serves as a pressing portion 7, function of which will be described later. The groove 4 of the pin 1 includes a tapered outer surface 8 facing the pressing portion 7. The tapered outer surface 8 gradually shrinks in diameter axially inwardly, and as will be described later, serves as a pressure receiving surface. The retaining ring 3 is made of an annular elastic metal, with a part of the ring cut out so that the ring can elastically spread and shrink in diameter. Further, the retaining ring 3 has a generally square section, with one corner of the square being in an inner diameter region (the lower side as in the figure) and another corner being in an outer diameter region (the upper side as in the figure).

According to the above described fastening structure between link and pin of a crawler belt, assembling operation can be completed by simply press-fitting the pin 1 into the pin insertion hole 5 of the link 2, then spreading and disposing the retaining ring 3 into the groove 4 of the pin 1, and finally removing the spreading force thereby allowing the retaining ring 3 to elastically shrink in diameter. Under this state, the retaining ring 3 has its inner diameter side contacting the tapered outer surface 8 whereas the outer diameter side has its inner side surface contacting the pressing portion 7. Hereinafter, in the retaining ring 3, the surface contacting the tapered outer surface 8 (i.e. the outer side surface on the inner diameter side) will be called a friction surface 9, and the surface contacting the pressing portion 7 (i.e. the inner side surface on the outer diameter side) will be called a pressed surface 10.

Figure 2:
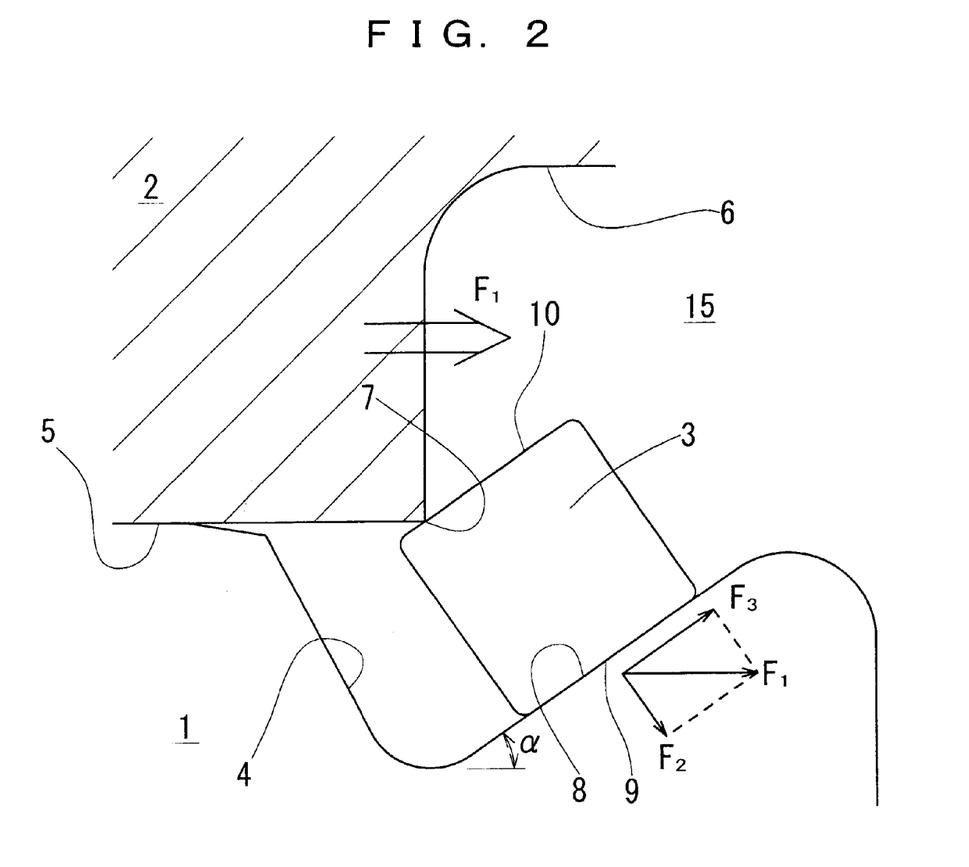
FIG. 2 is an enlarged sectional view of a principal portion, showing an operating state of the above embodiment.

Under the state of assembly as described above, if the link 2 tends to move out of the pin 1, the following function prevents the disengaging movement. Specifically, first, if the link 2 tends to move rightward as in FIG. 1 (i.e. if the pin 1 tends to make a relative movement in a disengaging direction toward the side away from the opening), then the pressing portion 7 of the link 2 presses the pressed surface 10 of the retaining ring 3, twisting the retaining ring 3 outward as shown in FIG. 2, thereby making the friction surface 9 of the retaining ring 3 contact the tapered outer surface, i.e. the pressure receiving surface 8. Under this state, the ring 3 is under a force acting in the disengaging direction (to the right as in the figure). This force $F_1$ can be divided into a component force $F_2$ acting vertically to the pressure receiving surface 8 and another component force $F_3$ acting along the pressure receiving 8. If the friction generated by the component force $F_2$ acting vertically to the pressure receiving surface 8 is greater than the component force $F_3$ acting along the pressure receiving surface 8, then the relative, disengaging movement of the pin 1 toward the side away from the opening is prevented. For this purpose, the pressure receiving surface 8 slanted axially inward is given a slant angle $\alpha$ that satisfies the above mentioned relationship $\mu \cdot F_2 > F_3$ (where $\mu$ represents friction coefficient).

According to the fastening structure of link and pin of a crawler belt described above, the retaining ring 3 contacts the pressure receiving surface 8 via its friction surface 9. For this reason, the retaining ring 3 has a greater area of contact with the pressure receiving surface 8 than in the prior art. Therefore, elastic restoring force of the retaining ring 3 alone can generate sufficient initial friction. Thus, there no longer is the need for the operation of inwardly driving the retaining ring 3 during the assembly. As a result, there no longer is the need for the specialized jig and the pressing apparatus for driving the retaining ring 3, and as a result, it becomes possible to reduce cost necessary for the assembling operation. Further, the shape of the pressing portion 7 and the pressure receiving surface 8, and material characteristic of the retaining ring 3 are so selected that even if the pin 1 and the link 2 are disassembled for a purpose of repair and so on, the retaining ring 3 can be reused since the retaining ring 3 is only elastically deformed at the time of the assembly.

Further, the slant angle $\alpha$ of the pressure receiving surface 8 slanting axially inward should only satisfy the above mentioned relationship $\mu \cdot F_2 > F_3$. Thus, there no longer is the need for high machining accuracy in the angle of the tapered surface as is in the prior art, and therefore it becomes possible to reduce relevant manufacturing cost. Further, the edge-like pressing portion 7 provided in the line 2 makes possible to allow for more generous tolerance in the shape and dimensions of the pressing portion 7 in the link 2 and of the pressure receiving surface 8 in the pin 1 than in the case where both are made as tapered pressure receiving surfaces.

Further, according to the prior art fastening structure of link and pin, the tapered surface 44 must be formed also in the link 2. However, since the link 2 has a non-circular outer shape, it is very difficult to form a tapered annular surface 44 in such an object as the link 2. On the contrary, according to the embodiment described above, the link 2 should only be formed with the pressing portion 7, and there is no need for forming the tapered surface. This leads to an advantage of simplified machining operation.

Figure 3:
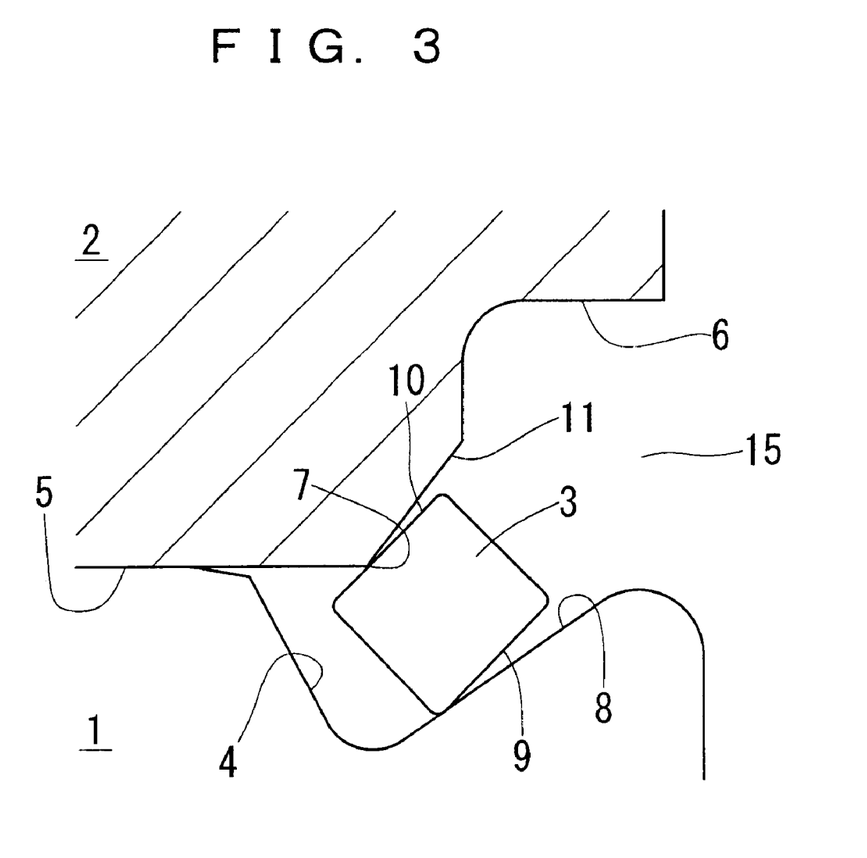
FIG. 3 is an enlarged sectional view showing a principal portion of a second embodiment.

FIG. 3 shows a second embodiment, in which the retaining ring 3 has a square section like the embodiment shown in FIG. 1. The difference however, is that the shape of a vicinity of the pressing portion 7 in the link 2 changed. Specifically, a tapered guide surface 11 having a diameter decreasing in an axially inward direction is formed on an outward side of the pressing portion 7. At the time of assembly, the guide surface 11 allows the pressed surface 10 of the retaining ring 3 to reliably contact the pressing portion 7, thereby making easy the assembling operation of the retaining ring 3. According to this embodiment, again, the same function and effect as achieved in the first embodiment can be obtained.

Figure 4:
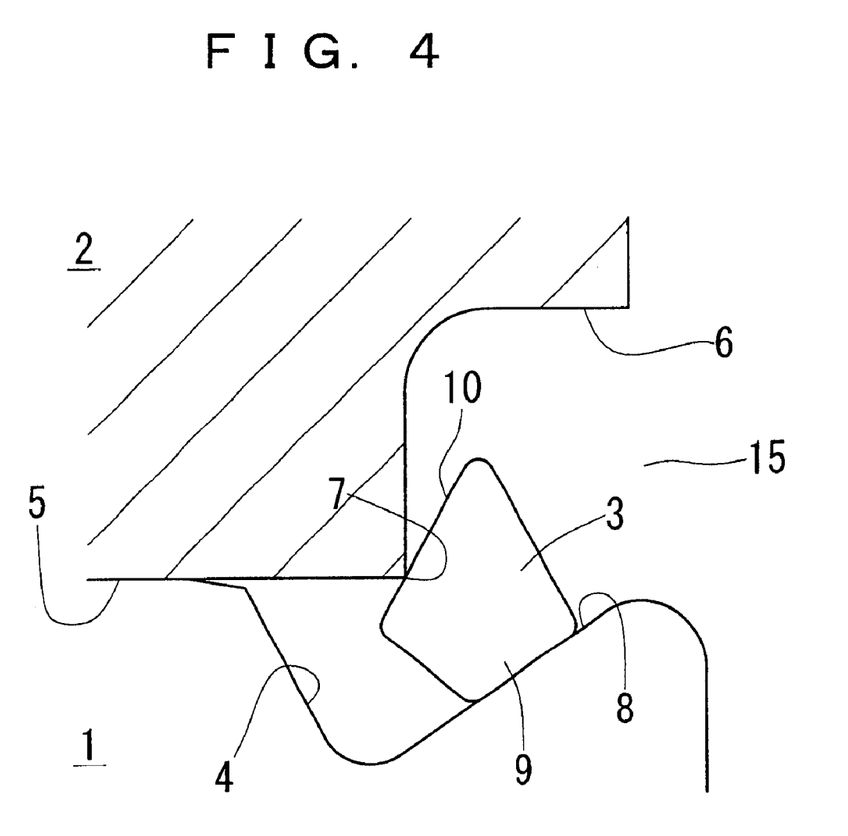
FIG. 4 is an enlarged sectional view showing a principal portion of a third embodiment.

FIG. 4 shows a third embodiment, in which the retaining ring 3 has a different shape in section. In this case, the section is not square as in the embodiments in FIG. 1 and FIG. 2 (in which the friction surface 9 and the pressed surface 10 are parallel to each other). Instead, the friction surface 9 and the pressing surface 10 are each tapered to have an outwardly increasing diameter, and further, a distance between the two surfaces increases in the outward direction. It should be noted here that the retaining ring 3 is given a laterally mirror symmetric section in the figure, so that the ring can be used also at the other end portion of the pin 1.

Figure 5A:
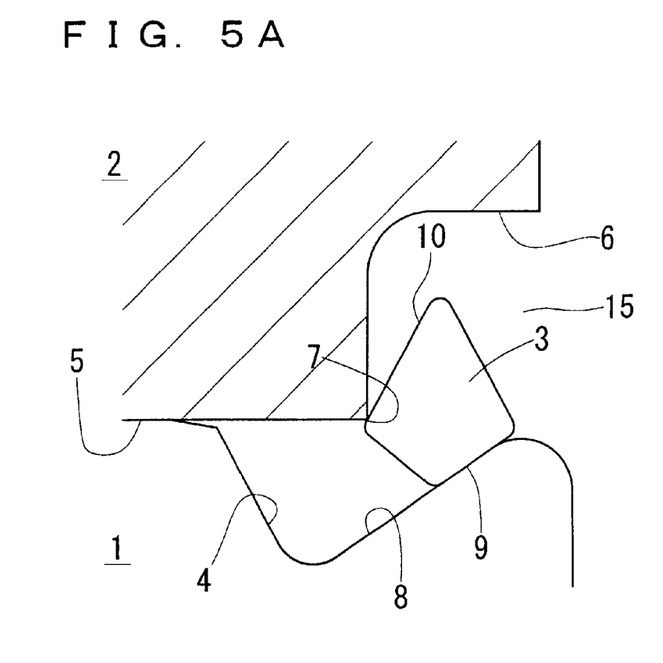
FIG. 5A is an enlarged sectional view of a principal portion for describing a state of assembly in the third embodiment.
Figure 5B:
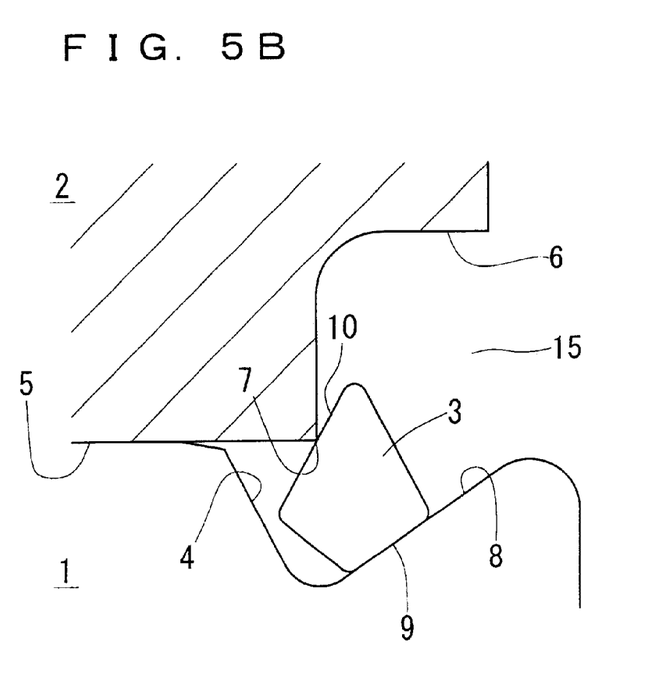
FIG. 5B is an enlarged sectional view of a principal portion for describing another state of assembly in the third embodiment.

Again, according to this fastening structure of link and pin of a crawler belt provided by the third embodiment, the same function and effect as achieved in the above can be obtained. In addition, there is another advantage in that even more generous tolerance can be allowed for in the shape and dimensions of the pressing portion 7 in the link 2 and of the pressure receiving surface 8 in the pin 1 than in the above described embodiments. Specifically, since the friction surface 9 and the pressed surface 10 of the retaining ring 3 are disposed in an outwardly opening taper pattern, as shown in FIG. 5A and FIG. 5B, the retaining ring 3 can now make engagement between the pressing portion 7 and the pressure receiving surface 8 not only at a place closer to the opening of the space 15 (FIG. 5A) but also at a place farther from the opening (FIG. 5B), making possible to prevent relative movement of the pin 1 in the disengaging direction. In other words, even if there is inconsistency in engaging dimension between the pressing portion 7 and the pressure receiving surface 8 resulting from machining error, assembling error and so on, the friction surface 9 and the pressed surface 10 of the retaining ring 3 are not limited in a certain fixed engaging dimension, and therefore can make respective engagements at various dimensions. This means an engagable range for the two surfaces is increased.

Figure 6:
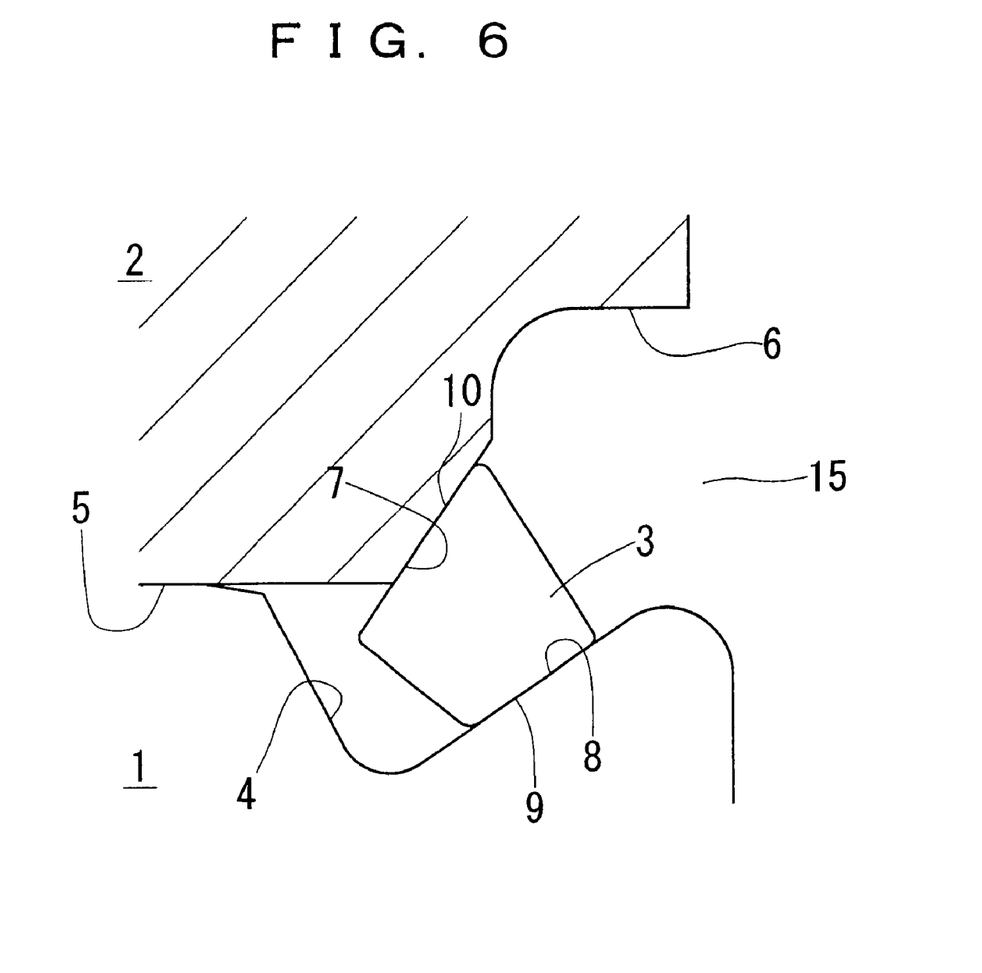
FIG. 6 is an enlarged sectional view showing a principal portion of a fourth embodiment.

FIG. 6 shows a fourth embodiment. In this embodiment, the retaining ring 3 has the same sectional shape as in FIG. 4 and FIG. 5, whereas the pressing portion 7 of the link 2 is made as a tapered, pressure receiving surface having a diameter gradually decreasing in an axially inward direction. Specifically, in this case, a pin insertion hole 5 also is formed with a pressure receiving surface 7 around the opening, in addition to the pressure receiving surface 8 formed at the outer end portion of the pin 1. With this arrangement, a distance between the pressure receiving surfaces 7, 8 gradually increases outwardly. According to this embodiment, a pressed surface 10 of the retaining ring 3 serves as a friction surface, i.e. both of the friction surfaces 9, 10 make contact with the pressure receiving surfaces 7, 8 respectively. Such a structure as the above brings about the functions and effects described earlier, and in addition, it becomes possible to further reliably prevent the relative movement of the pin 1 in the disengaging direction since the retaining ring 3 now has even more increased area of contact. It should be noted here that in this case again, the retaining ring 3 is given a laterally mirror symmetric section as in the figure, so that the ring can be used also at the opposite end portion of the pin 1.

Figure 7A:
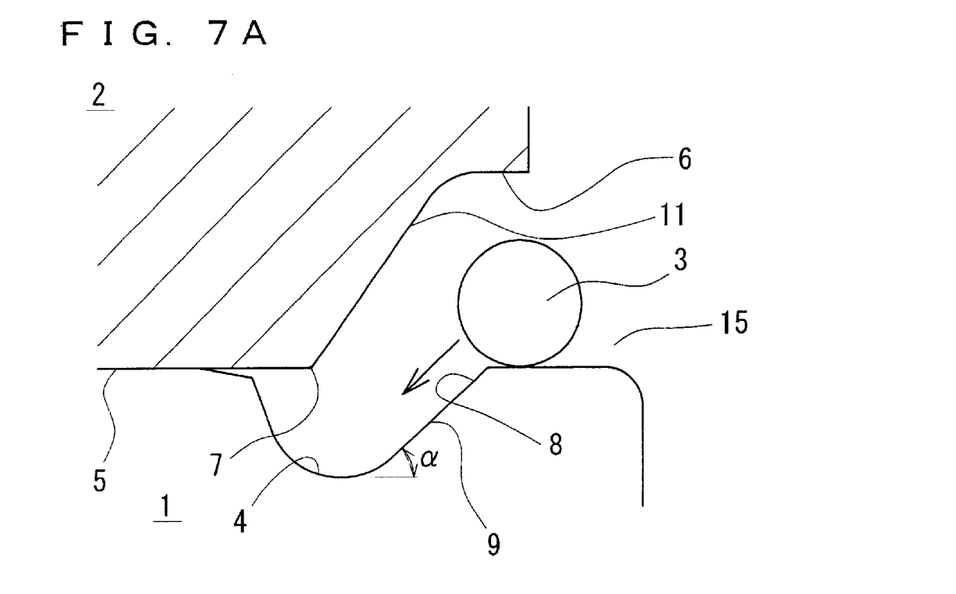
FIG. 7A is an enlarged sectional view of a principal portion showing a state before assembly in a fifth embodiment.
Figure 7B:
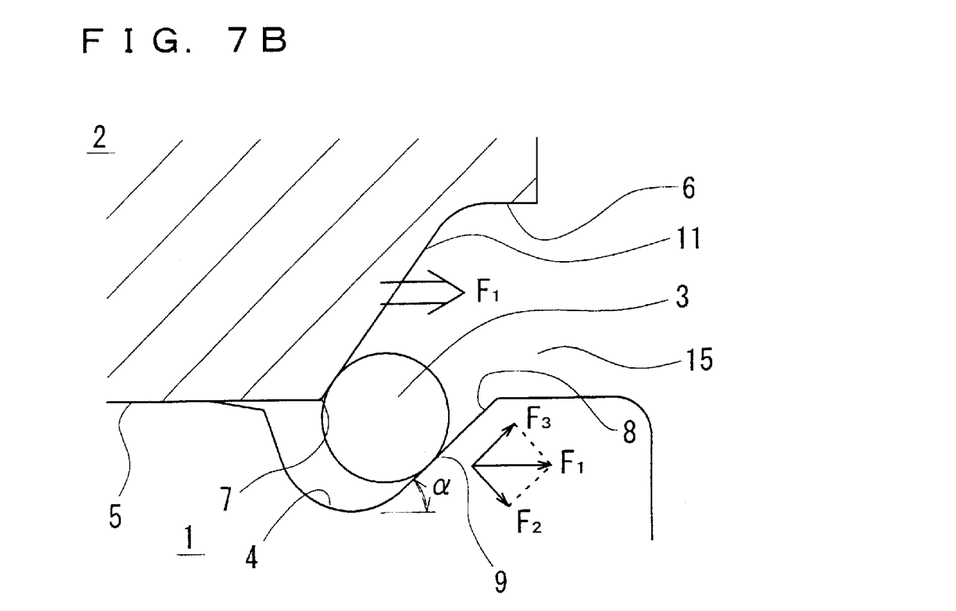
FIG. 7B is an enlarged sectional view of a principal portion showing a state after assembly in the fifth embodiment.

FIG. 7A and FIG. 7B show a fifth embodiment, in which the retaining ring 3 is made to have a circular section. Hereinafter, detailed description will be made with reference to FIG. 7A and FIG. 7B. Referring first to FIG. 7A, the pin 1 has an end, close to which a circumferential groove 4 having a generally triangular section is formed. Further, the link 2 is formed with a pin insertion hole 5 into which the pin 1 is press-fitted. The pin insertion hole 5 has an opening, around which an annular recess 6 is formed. The groove 4 of the pin 1 and the recess 6 of the pin insertion hole 5 form an annular fitting space 15 recessing axially inward and having an annular opening, between a circumferential edge of the opening of the pin insertion hole 5 and the outer end portion of the pin 1. Further, an edge-like pressing portion 7 is formed at a location where the recess 6 meets the opening of the pin insertion hole 5, further outward of which, starting from the pressing portion 7 in an outward direction, there is formed an axially slanted, tapered guide surface 11 gradually increasing in diameter. The groove 4 of the pin 1 has a tapered outer surface 8 facing the pressing portion 7. The tapered outer surface 8 gradually increases in diameter in the axially outward direction, and as will be described later, serves as a pressure receiving surface. With this arrangement, the tapered outer surface (hereinafter called a pressure receiving surface 8) has a slanting angle, slanting with respect to the axis, smaller than a slanting angle of the guide surface 11. On the other hand, the retaining ring 3 is made of an annular elastic metal, with a part of the ring cut out so that the ring can elastically spread and shrink in diameter. Further, the retaining ring 3 has a generally circular section, being press-contacted to the pressing portion 7 and the pressure receiving surface 8 in the above mentioned space 15.

With the above-described fastening structure between link and pin of a crawler belt, assembling operation involves press-fitting the pin 1 into the pin insertion hole 5 of the link 2, then spreading and disposing the retaining ring 3 into the groove 4 of the pin 1, and then removing the spreading force thereby allowing the retaining ring 3 to elastically shrink in diameter. Thereafter, the retaining ring 3 is pushed inwardly into the space 15 to complete the assembly. Under this state shown in FIG. 7B, the retaining ring 3 has its outer diameter side press-contacted by the edge-like pressing portion 7 whereas the inner diameter portion press-contacted by the tapered pressure receiving surface 8. Under this state, a vicinity of the press-contacted portion in the retaining ring 3 is elastically deformed by the pressure, providing a surface on the retaining ring 3, on the side facing the pressure receiving surface 8. In other words, a friction surface 9 contacting the pressure receiving surface 8 is created.

Under the state of assembly as described above, if the link 2 tends to move out of the pin 1, the following function controls the disengaging movement. Specifically, under the sate where the pressing portion 7 of the link 2 press-contacts the retaining ring 3 and the friction surface 9 of the retaining ring 3 press-contacts the pressure receiving surface 8 of the pin 1, if the link 2 tends to move rightward as in FIG. 7 (i.e. if the pin 1 tends to make a relative movement in the disengaging direction toward the side away from the opening), then the retaining ring 3 comes under a force acting toward the disengaging direction (to the right as in the figure). This force $F_1$ can be divided into a component force $F_2$ acting vertically to the pressure receiving surface 8 and another component force $F_3$ acting along the pressure receiving 8. If the friction generated by the component force $F_2$ acting vertically to the pressure receiving surface 8 is greater than the component force $F_3$ acting along the pres-sure receiving surface 8, then the relative disengaging movement of the pin toward the side away from the opening is prevented. Therefore, according to this embodiment, the pressure receiving surface 8 slanted axially inward is given a slant angle $\alpha$ that satisfies the above mentioned relationship $\mu \cdot F_2 > F_3$ (where $\mu$ represents friction coefficient).

According to the above described fastening structure between link and pin of a crawler belt, the friction surface 9 of the retaining ring 3 provided by the assemblage makes contact with the pressure receiving surface 8. Therefore, the retaining ring 3 has a greater area of contact with the pressure receiving surface 8 than in the prior art, making possible to obtain sufficient initial friction. Further, since the retaining ring 3 receives the pressure at a point, it becomes possible to perform the assembling operation more easily, using less pressing force than in the case where the two members are each formed with a tapered surface, i.e. than in the case where the pressure is received on a surface. As a result, operating efficiency in the assembling operation can be improved. Further, the shape of the pressing portion 7 and the pressure receiving surface 8 and material characteristic of the retaining ring 3 are so selected that even if the pin 1 and the link 2 are disassembled for a purpose of repair and so on, the retaining ring 3 can be reused since the retaining ring 3 is only elastically deformed at the time of the assembly.

Further, the slant angle $\alpha$ of the pressure receiving surface 8 slanting axially inward should only satisfy the above mentioned relationship $\mu \cdot F_2 > F_3$. Thus, there no longer is the need for high machining accuracy in the angle of the tapered surface as is in the prior art, and therefore it becomes possible to reduce relevant manufacturing cost. Further, the edge-like pressing portion 7 in the link 2 according to the present embodiment makes possible to allow for more generous tolerance in the shape and dimensions of the pressing portion 7 in the link 2 and of the pressure receiving surface 7 in the pin 1 than in the case where both are made as tapered pressure receiving surfaces.

Further, according to the prior art fastening structure of link and pin, the tapered surface 44 must be formed also in the link 2. However, since the link 2 has a non-circular outer shape, it is very difficult to form a tapered annular surface 44 in such an object as the link 2. On the contrary, according to the embodiment described above, the link 2 should only be formed with the edge-like pressing portion 7, and there is no need for forming the tapered surface. This leads to an advantage of simplified machining operation.

Embodiments of the fastening structure between link and pin of a crawler belt according to the present invention being described thus far, the fastening structure between link and pin of a crawler belt according to the present invention is not limited to those described in the embodiments, but can be varied in many ways. For example, according to the embodiments, the pressure receiving surface 9 is formed in the pin 1 and the pressing portion 7 is formed in the link 2. Conversely, however, the pressing portion 7 may be formed in the pin 1 and the pressure receiving surface 9 may be formed in the link 2. Further, the sectional shape of the retaining ring 2 is preferably mirror symmetric as in the above embodiments, for usability at either end of the pin 1. However, the shape may not be mirror symmetric depending on a situation, though the square or circular section as in FIG. 1, FIG. 3 or FIG. 7 brings about such advantages as easiness in manufacture and low cost in application.

What is claimed is:

1. A fastening structure of link and pin of a vehicle crawler belt, wherein an annular space (15) being formed between a circumferential edge of an opening of a pin insertion hole (5) of a link (2) and an outer end portion of a pin (1) to be inserted in the pin insertion hole (5), a retaining ring (3) being disposed in the space (15) whereby preventing relative, disengaging movement of the pin (1) toward a side away from the opening; characterized in that one of the circumferential edge of the opening of the pin insertion hole (5) of the link (2) and the outer end portion of the pin (1) is formed with a tapered pressure receiving surface (8) having a diameter gradually decreasing in an axially inward direction, the other being formed with a pressing portion (7), and the retaining ring (3) being formed with a friction surface (9) to be press-contacted to the pressure receiving surface (8) by a force from the pressing portion (7) upon development of the relative movement in the disengaging direction.

2. The fastening structure of link and pin of a vehicle crawler belt according to claim 1, characterized in that the retaining ring (3) includes a pressed surface (10) contacted by the pressing portion (7), and the friction surface (9); the pressed surface (10) and the friction surface (9) being farther away from each other in an outward direction.

3. The fastening structure of link and pin of a vehicle crawler belt according to claim 1 or claim 2, characterized in that the retaining ring (3) has a square section.

4. The fastening structure of link and pin of a vehicle crawler belt according to claim 1 or claim 2, characterized in that the pressing portion (7) is an edge.

5. A fastening structure of link and pin of a vehicle crawler belt, wherein an annular space (15) being formed between a circumferential edge of an opening of a pin insertion hole (5) of a link (2) and an outer end portion of a pin (1) to be inserted in the pin insertion hole (5); a retaining ring (3) being disposed in the space (15) whereby preventing relative disengaging movement of the pin (1) toward a side away from the opening; characterized in that one of the circumferential edge of the opening of the pin insertion hole (5) of the link (2) and the end portion of the pin (1) is formed with a pressure receiving surface (8) having a diameter gradually decreasing in an axially inward direction, the other being formed with an edge-like pressing portion (7), and the retaining ring (3) press-contacting each of the pressing portion (7) and to the pressure receiving surface (8).

6. The fastening structure of link and pin of a vehicle crawler belt according to claim 5, characterized in that the retaining ring (3) has a circular section.

* * * * *